United States Patent [19]

Downton et al.

[11] Patent Number: 5,411,755
[45] Date of Patent: May 2, 1995

[54] PROCESS AND COMPOSITION FOR SWEET JUICE FROM CUCURBITACEAE FRUIT

[75] Inventors: Galen E. Downton, Erlanger; Michael W. Maxwell, Dayton, both of Ky.; Heather J. Harper, Hamilton, Ohio; M. Joseph Mohlenkamp, Jr.; George P. Rizzi, both of Cincinnati, Ohio; Manfred Litke, Waldems-Steinfischbach, Germany; Karin Romer, Bad Soden, Germany; Ruediger Engel, Osthofen, Germany

[73] Assignee: The Procter & Gamble Company, Cincinnati, Ohio

[21] Appl. No.: 182,601

[22] Filed: Jan. 26, 1994

Related U.S. Application Data

[63] Continuation-in-part of Ser. No. 56,459, May 3, 1993, abandoned, which is a continuation-in-part of Ser. No. 17,936, Feb. 16, 1993, abandoned, and Ser. No. 17,937, Feb. 16, 1993, abandoned.

[51] Int. Cl.$^6$ .................................................. A23L 2/78
[52] U.S. Cl. ...................................... 426/599; 426/484; 426/488; 426/548; 426/590; 426/626; 426/650; 426/654
[58] Field of Search ............... 426/548, 590, 599, 650, 426/654, 626, 484, 488

[56] References Cited

U.S. PATENT DOCUMENTS 4,084,010  4/1978  Takemoto et al. ................. 426/548

FOREIGN PATENT DOCUMENTS

| | | | |
|---|---|---|---|
| 52-083986 | 7/1977 | Japan | C07G 3/00 |
| 52-143257 | 11/1977 | Japan | A23L 1/22 |
| 56-117781 | 9/1981 | Japan | A23L 1/22 |
| 58-071868 | 10/1981 | Japan | A23L 1/22 |
| 56-158072 | 12/1981 | Japan | A23L 1/22 |
| 57-086266 | 5/1982 | Japan | A23L 1/236 |

OTHER PUBLICATIONS

Giovanelli et al., "Apple Juice Stabilization by Combined Enzyme-Membrane Filtration Process", *Journal unknown*, vol. 26 (1993) No. 1, pp. 1–7.

Jiangsu New Medical College, Zhongyao Dachidian (Encyclopedia of Traditional Chinese Medicine), People's Publishing Company, Shanghai, (1977), pp. 1356–1357.

Kasai et al., "Sweet Cucurbitane Glycosides from Fruits of *Siraitia siamensis* (chi-zi luo-han-guo), a Chinese Folk Medicine", *Agric. Biol. Chem.*, vol. 53 (1989) No. 12, pp. 3347–3349.

Makapugay et al., "High-Performance Liquid Chromatographic Analysis of the Major Sweet Principle of Lo Han Kuo Fruits", *J. Agric. Food Chem.*, vol. 33 (1985), pp. 348–350.

Matsumoto et al., "Minor Cucurbitane-Glycosides from Fruits of *Siraitia grosvenori* (Cucurbitaceae)", *Chem. Pharm. Bull.*, vol. 38 (1990) No. 7, pp. 2030–2032.

Matsumoto et al., "Quality Improvement of Citrus Juices", *Kogyo Gijutsu Senta*, vol. 30 (1992), pp. 49–52. (Abstract only).

"New Color Adsorbent", *Food Engineering*, Mar. 1993, p. 52.

Article re. Nestle's "Gum Syrup", *Nikkei Sangyo*, Mar. 25, 1992.

Sumitani et al., "FPD-GC Determination of S-Methylmethioninesulfonium in Satsuma Mandarin Juice", *Agric. Biol. Chem.*, vol. 55 (1991) No. 11, pp. 2899–2900.

Giovanelli et al., "Apple Juice Stabilization by Combined Enzyme-Membrane Filtration Process", *Food Science and Technology-Lebensmittel-Wissenschaft & Technologie*, vol. 26 (1993) No. 1, pp. 1–7.

*Primary Examiner*—Helen Pratt
*Attorney, Agent, or Firm*—Rose Ann Dabek; Milton B. Graff, IV; George W. Allen

[57] ABSTRACT

The present invention involves processes preparation of a sweet juice from fruit of the Cucurbitaceae family comprising the following steps of separating peels and seeds from the juice; optionally acidifying the juices; removing off-flavor precursors from the juice; and removing a methylene chloride extractable volatiles fraction containing off-flavor materials from the juice. The present invention also involves sweet juices from the fruit of the Cucurbitaceae family comprising less than about 100 ppm (dry basis) methionine, and from about 0.1% to about 15% (dry basis) sweet terpene glycoside.

23 Claims, No Drawings

PROCESS AND COMPOSITION FOR SWEET JUICE FROM CUCURBITACEAE FRUIT

CROSS REFERENCE TO RELATED APPLICATIONS

This application is a continuation-in-part-of the co-pending application having U.S. Ser. No. 08/056,459, filed May 3, 1993, now abandoned, is a continuation-in-part of the now-abandoned application having U.S. Ser. No. 08/017,936, filed Feb. 16, 1993, in the names of Marvin J. Mohlenkamp, Jr., Galen E. Downton, Heather J. Harper and Michael W. Maxwell; and also of the now-abandoned application having U.S. Ser. No. 08/017,937, filed Feb. 16, 1993, in the names of Galen E. Downton, Michael W. Maxwell, Heather J. Harper and Marvin J. Mohlenkamp, Jr.

TECHNICAL FIELD

This invention relates to the preparation of concentrated and stabilized very sweet fruit juices of the Cucurbitaceae family.

BACKGROUND OF THE INVENTION

Consumption of fruit and vegetable juices has greatly increased as better quality, better tasting and higher purity juice products have been developed. The challenge of producing beverages acceptable to a broad range of consumers involves balancing the flavor, aroma, appearance and satisfactory mouthfeel. The level of sugars and sweetness affect these characteristics.

As consumers become more calorie conscious, they become concerned about their daily sugar consumption. A good tasting beverage which is low in both calories and sugars is desirable. Lower calorie juices have been made by removing some of the sugars and adding artificial sweeteners or by diluting the juice. Consumers are also concerned about their intake of artificial sweeteners.

Some plants of the Cucurbitaceae family, found mostly in southern Asia, produce unique intensely sweet fruits. These fruits have a characteristic intense sweetness due to the presence of terpene glycosides, natural materials which can provide the sweetness of natural sugar with negligible calories and without the need for artificial sweeteners.

The best known fruit in this family, called Luo Han Guo, is produced by the plant *S. grosvenorii* found in southern China. The fresh fruit has an earthy, beany, vegetable flavor. Some fruits also have bitter tastes. The fresh fruits degrade on standing within a few weeks. These fruits contain very sweet terpene glycosides called mogrosides. Mogrosides IV and V, 11-oxomogroside V, and siamenoside I have been identified and characterized chemically as the very sweet components of the geuus Siraitia. See for example, Matsumoto, et al., *Chem. Pharm. Bull.*, 38 (7), 2030–2032 (1990).

Traditionally these fruits are slowly dried in ovens and stored in the dry state until used. The drying process preserves the fruit and removes most of the objectionable flavor of the fresh fruit. The drying also causes the formation of bitter, astringent and some browned flavors. These flavors restrict the use of the dried fruits and dried fruit extracts to the preparation of dilute teas and soups and products to which sugar, honey and the like are added.

Luo Han Guo, the most common Cucurbitaceae fruit, is seldom used fresh due to the problems of storing it, its unattractive vegetable flavor and its tendency to form off-flavors. The juice of Luo Han Guo fruit has a natural pH of about 6 and it contains sugars which can brown and ferment. The pectin eventually gels on standing.

Juices can be concentrated or dried by evaporation processes which involve heating juice sometimes under vacuum. Hydrolysis and/or oxidation of components of the juice can occur. Lipids can be oxidized and amino acids and sugars can undergo browning reactions during evaporation. Such degradation products can cause off-flavors in the concentrated juice.

It is generally recognized that evaporation concentration processes are useful and fairly effective, but there is a significant loss of aroma and flavor compounds which occurs. In the case of juices from the Cucurbitaceae family, the loss of certain aromas may be desirable.

It is an object of the present invention to provide a process for producing a very sweet fruit juice and concentrate made from very sweet juices of the Cucurbitaceae family, including Luo Han Guo juice. It is also an object to produce this juice so that it does not contain objectionable off-flavors, and does not reform substantial quantities of off-flavors on storage.

It is a further object of this invention to produce a juice, and in particular, a fruit juice, which is lower in sugar and calories by blending the very sweet Cucurbitaceae juices with other fruit juices.

These and other objects of this invention will become apparent from the description of the invention hereinafter.

SUMMARY OF THE INVENTION

In its process aspects, the present invention relates to a process for preparing sweet juice from the fruit of the Cucurbitaceae family. Such process comprises the steps of:
(a) separating peel, seeds and some fruit pulp from juice of the fruit;
(b) optionally, acidifying the juice;
(c) removing off-flavor precursors from the juice;
(d) removing a volatiles fraction containing off-flavor materials from the juice and, optionally, concurrently concentrating the juice.

Optionally the juice or concentrate can be clarified. Also optionally, the juice is pasteurized using conditions which avoid production of off-flavors.

In its composition aspects, the present invention relates to Cucurbitaceae sweet fruit juice or puree with off-flavor materials and precursors removed. This Cucurbitaceae fruit juice or puree is characterized by having a sweetness greater than sugar (sucrose) on a dry weight basis. This product contains at least 0.1%, preferably at least 1%, sweet terpene glycosides, and no more than 100 ppm free methionine, preferably no more than 50 ppm on a dry weight basis. The preferred concentrated juices have a solids content of from about 15% to about 65%.

DETAILED DESCRIPTION OF THE INVENTION

As used herein, the term "comprising" means various components can be conjointly employed in the compositions and methods of this invention Accordingly, the terms "consisting essentially of" and "consisting of" are embodied in the term comprising. All ratios, proportions and percentages herein are by weight, unless otherwise specified.

The sweet juice and concentrates thereof of this invention can be made from any fruit from the plant of the family Cucurbitaceae, tribe Jollifieae, subtribe Thladianthinae, genus Siraitia. Especially preferred are the genus/species *S. grosvenorii, S. siamensis, S. silomaradjae, S. sikkimensis, S. africana, S. borneensis,* and *S. taiwaniana.* The most preferred fruit is the genus/species *S. grosvenorii,* which is often called Luo Hah Guo fruit. Although the following description of the process of this invention is described with particular reference to making a Luo Han Guo sweet juice or concentrate thereof, it will be understood that the process is not limited thereto. The process is equally applicable to other sweet fruit juices of Cucurbitaceae family which contain at least 0.01% sweet triterpene glycosides or mogrosides. Preferably the juices will contain from 0.1% to about 15% mogrosides, preferably mogroside V, mogroside IV, (11-oxo-mogroside V) siamenoside and mixtures thereof.

Processing of the Fruit

The fresh fruit is selected, stored, and processed to provide a high level of sweetness, remove/avoid decayed fruit, and facilitate removal of the outer peel from the inner meat.

Typically the fruit is picked at a slightly under ripe state and allowed to ripen during storage. Alternatively the fruit may be allowed to fully ripen on the vine. During the final stages of ripening, some moisture is lost from the fruit and there is a slight contraction of the inner fruit and separation from the outer peel. Also, the level of sweetness increases. Under-ripe fruit is more firm, tends to be less sweet and may be bitter. Ripe fruit infected by insects such as fruit fly larvae, rapidly decays and should be removed and discarded.

The fruit is typically thoroughly washed to remove all adhering dirt, preferably using disinfectant solutions. Washing may be accomplished by dumping the fruit into troughs of moving water, separating them from the water, and spray washing the fruit. They can also be treated with strong water sprays as they move along a roller-type conveyor. The fruit is then preferably sorted by hand or machine to remove all partially or wholly decayed fruit or fruit which has had insect damage. The wash water may contain chlorine (about 5 to 20 ppm) or other disinfectant.

The washed and sorted fruit is typically prepared for extraction by removing the crest or peel by any conventional method for coring fruits and vegetables. The fruit can be cut in half and the center scooped out by hand or by mechanical separators. Steam peeling is also acceptable. Optionally, the fruit does not have to be peeled as long as peel and seeds are removed quickly from the mashed fruit. This prevents off-flavor formation due to juice and peel contact.

Preferably, the fruit is mashed in an oxygen-restricted atmosphere. Equipment used for mashing apples, potatoes and other soft fruits and vegetables can be used to pulverize the fruit core, such that seed break-up is minimal. One type of mashing apparatus, a Ratz Muhle (manufactured by Lauffer Company, in Horb, Germany), grates the fruit to a mash; a hammer mill (e.g., Fitzmill ®, made by Fitzpatrick Company, Elmhurst, Ill.) can be used to comminute the fruit such that it passes through the finisher.

Other common apparatus for forming a puree or comminuted juice are 1) hydraulic cider press, 2) pneumatic juice press, 3) continuous screw type press, 4) continuous plate press, 5) semi-continuous plate press, 6) horizontal basket press, 8) screening centrifuge, 7) rack and cloth press, and 9) continuous belt press. Juice pressing methods are described in Nelson et al., *Fruit and Vegetable Juice Processing Technology,* AVI Publishing Co., pp 216–229 (1980).

Luo Han Guo contains a large number of seeds. The peel and seeds are about 40–50% by weight of the fruit. Water can be added to the peeled fruit during processing to help separate the seeds. It will also dilute the juice, but can be removed in a concentration step.

The raw juice or fruit as it comes from the mashing, comminuting or extracting process contains pulp, seeds, and possibly peel. These are separated from the juice in a "finisher" or centrifugal extractor which contains a screen. The screen opening size can range from about 0.5 mm to about 6.5 mm. When the screen opening is larger than 6.5 mm, small seeds pass into the juice and contaminate it.

Smaller screens will retain pulp along with the seeds. The opening size can be adjusted depending on the desired thickness of the resulting puree. Finished juice, that which has gone through the screening process, can also be passed through a centrifuge to adjust pulp level. Pulp is the pectin, cellulose and small fruit pieces containing juice. It is the fruit meat.

The juice obtained from the process steps described above is not a clear juice but is more like a juice puree. The term "juice", as used herein, includes such juice puree or juice with pulp. When the pulp or solid particles are substantially removed, the juice is referred to as clear juice.

Peel/Seed/Pulp Extraction

The peel/seeds/pulp separated from the juice can optionally be extracted with hot water to recover more juice. Extraction conditions should be controlled to minimize extraction of unwanted off-flavors. The ratio of water to peel/seed/pulp should be less than about 2:1, preferably about 1.5:1 to about 0.7:1, more preferably about 1:1. Water temperature should be below about 100° C., preferably about 70° C. to about 90° C., more preferably about 80° C. Contact time between the water and peel/seed/pulp should be less than about 1 hour, preferably about 20 min. to about 40 min., more preferably about 30 minutes. The extract can be separated from the solid material by conventional techniques, such as settling, straining, filtering or centrifuging. The extract obtained can be combined with the juice previously separated from peel/seed/pulp.

Acidification

Acidification is optional in the present invention, but is an important step in the preparation of preferred Luo Han Guo juice of this invention. Acidified juice is lighter in color, less bitter and does not gel. The lack of gelling aids in the processing and drinkability of the juice. Acidification also makes the juice taste more fruity and less "beany" or "vegetably".

Acid is added to the juice, preferably before or during homogenization, to lower the pH from about 6.0 to less than about 5.3, preferably to about 3.5 to about 4.5, and most preferably to about 3.8 to about 4.2. Any food compatible organic or inorganic acid can be used. Citric, malic, lactic, tartaric and acetic acids are preferred.

Phosphoric, sulfuric and hydrochloric acids can be used, but they can contribute an astringent or bitter flavor. Nitric acid can be used but it may not be approved for use in all beverages. Mixtures of these acids can also be used. Other fruit juices which are acidic, such as citrus, pineapple and apple juices can be used to acidify the juice.

The acidification prevents the puree from gelling when it is concentrated. At pH's below 4.5, and preferably in the range of 3.8 to 4.2, the pasteurized juice is microbially more stable. Optionally, gelling can be prevented by pectin removal as described below.

Homogenization

The juice exiting the finisher may contain large pieces of fruit pulp material. If so, it is preferably blended in a high speed mixer such as a blender, in-line mill or homogenizer. The juice has a tendency to foam. The headspace in the blender or homogenizer should be minimized to prevent or minimize the aeration of the juice during processing. The purpose of this step is to lower the particle size to less than about 850 microns.

Removal of Off-Flavor Precursors

Evaporation of volatiles from the juice will remove much of the undesirable flavor notes from the juice. However, off-flavor precursors will remain in the juice. The subject invention includes a process step for removing off-flavor precursors from the juice. The Cucurbitaceae fruit juice or puree can also be treated at any step or stage of the process to remove off-flavor materials and precursors, which include sulfurous materials and/or off-flavor precursors which include sulfur-containing amino acid materials. The precursors are the source of undesirable sulfurous or vegetable-like odors and off-flavors which can form in the finished sweet juice or puree product.

Ideally the juice or puree material employed in the process herein will be treated to remove substantially all of the volatile sulfurous materials and sulfur-containing amino acid based off-flavor precursors. Such precursors include methionine, S-methyhnethionine, cystine, and cysteine, and proteins and peptides containing them. It has been found that substantially improved Cucurbitaceae fruit juice can be prepared by the processes of the present invention by reducing the amino-nitrogen compounds of the juice, which include such sulfur-containing amino acids, peptides and proteins, by at least about 70% (only about 30% of the original amino nitrogen content remaining) while reducing mogroside or other sweet terpene glycosides content of the juice by no more than about 20% (at least about 80% of the original mogroside content remaining). More preferably, amino nitrogen content is reduced by at least about 80% while holding the removal of mogroside to no more than about 15%. The present invention processes preferably reduce by at least about 80%, more preferably by at least about 90%, the free amino acid methionine, and other sulfur-containing amino acids, from the juice.

Removal of such off-flavor materials and precursors can include treatment of the juice material to remove pulp solids therefrom, treatment of the juice material to remove sulfur-containing amino acids and soluble protein precursors thereof, and/or treatment of juice material to remove already-formed off-flavor materials including sulfur-containing volatiles such as H2S, methional, methionol, dimethylsulfide and methylmercaptan. S-methyimethional would be a decomposition product of any S-methyl methionine present. A wide variety of precipitating agents, filter aids, adsorbents, ion exchange resins and other deodorizing/deflavoring materials can be used for pulp, amino acid, protein and other off-flavor material and precursor removal. Several types of mechanical separation techniques are also available which can be used with or without these processing aids. Temperatures, pressures and other process parameters can be varied to bring about removal of the unwanted materials. It is important, however, that reagent quantities, contact times and other process conditions be controlled so that mogroside loss is minimized while removal of off-flavor materials and precursors is maximized.

Removal of off-flavor materials and precursors by removal of pulp solids and use of ion exchange resins, fining agents, adsorbents, and precipitating agents can be accomplished in a single step or separate or multiple steps, preferably using filtration or centrifugation to remove pulp solids, ion exchange resins, fining agents, adsorbents and precipitates from the juice. The processes may be batch or continuous, and are suitably carried out at temperatures of from about 0° C. to about 60° C.; lower temperatures are generally preferred to inhibit microbial growth. Preferred processes of the present invention include removal of pulp from the juice; either in the same step with removal of peel and/or seeds, or in a separate step. Water can be added to the juice to dilute it and help in separation of pulp from the juice. After such pulp removal, the juice preferably contains less than about 2% pulp, more preferably less than about 1% pulp. Mechanical separation techniques, such as centrifugation and filtration can be used.

Preferred processes of the present invention include the treatment of the juice, before or after acidification, with enzyme. Treatment of the juice with certain enzymes, such as pectinase, amylase, or multienzyme combinations (e.g., pectinase, cellulose, glycosidase), can help in the removal of off-flavor materials and precursors, and in clarification of the juice. Pectinase is a preferred enzyme; it removes pectin from the juice, providing clarity and preventing gelling of the juice. Suitable amounts of enzymes, especially pectinase, added to the juice (generally as a dilute solution) are from about 0.001% to about 1%, preferably from about 0.005% to about 0.05% (dry basis). The pectinase is allowed to react with the juice preferably until it is substantially free of pectin, typically for at least about 0.5 hr., preferably from about 1 hr. to about 2 hr., at a temperature of from about 10° C. to about 60° C., preferably from about 40° C. to about 50° C.

Off-flavor materials and precursors are preferably removed from the juice by the use of an ion exchange resin, preferably a cation exchange resin. Preferred are strong acid cation exchange resins, such as sulfonated polystyrene/divinylbenzene copolymer resins. Also useful are weak acid cation exchange resins, such as polyacrylic acid resins. Ion exchange resins quickly remove sulfur-containing amino acids and soluble peptides and proteins from the juice. More slowly, the ion exchange resins remove mogrosides from the juice. Therefore, the time for which the ion exchange resins is contacted with the juice is limited, in order to maximize removal of the sulfur-containing compounds but minimize removal of the mogrosides. Suitable contact times between ion exchange resins and the juice are from about 5 min. to about 50 min., preferably from about 10 min. to about 25 min., more preferably for about 15 min. Suitable amounts of ion exchange resins used are from about 5% to about 30% preferably from about 10% to about 25%, more preferably from about 15% to about 20%; where percents are on a volume/volume basis. This process step is typically carried out at a temperature of from about 0° C. to about 30° F., preferably from about 5° C. to about 10° C. The ion exchange resins are preferably blended with the juice with mixing, and removed from the juice by filtration or centrifugation. The juice can be diluted, suitably to from about 3 Brix to about 10 Brix, prior to treating with ion exchange resin. Ion exchange treatment is preferably carried out on juice from which much of the pulp has been removed, preferably on clear juice.

Off-flavor materials and precursors are also preferably removed from the juice by the use of adsorbing and/or fining agents. Such agents help remove sulfur-containing compounds, especially proteins and amino acids. Suitable adsorbents/fining agents include activated charcoal, bentonite, bleaching earth (Filtrol F105), Kaolin, perlite, diatomaceous earth, cellulose, cyclodextrin polymer, and insoluble polyamide (e.g., nylon). Many of these materials act as filtering or centrifugation aids. Removal of off-flavor materials and precursors can also be aided by treating the juice or puree with precipitating agents such as gelatin, tannin/gelatin, Sparkolloid, and water colloidal solutions of silicic acid (silica).

Preferred processes of the present invention include removal of off-flavor materials and precursors from the juice by blending fining and/or adsorbent and/or precipitating agents to the juice, and then removing the resulting agent/precipitate, preferably by filtration or centrifugation. The preferred agents used and suitable amounts are as follows:

activated charcoal in an-amount of from about 0.1% to about 5%, preferably from about 0.25% to about 2%;

gelatin (preferably added as a dilute solution) in an amount of from about 0.001% to about 0.5%, preferably from about 0.005% to about 0.5% (dry basis);

bentonite (preferably added as a slurry) in an amount of from about 0.05% to about 3%, preferably from about 0.1% to about 1% (dry basis);

silica in an amount of from about 0.1% to about 5%, preferably from about 0.25% to about 2% (dry basis).

These agents are suitably blended with the juice until the desired effect is achieved, typically for at least about 0.5 hr., preferably for from about 1 hr. to about 2 hr., at a temperature of from about 10° C. to about 60° C., preferably from about 20° C. to about 50° C.

Removal of Volatiles and Concentration

The removal of off-flavor precursors and materials described above may not remove all off-flavor volatiles, including sulfur-containing volatiles, from the juice. Such off-flavor volatiles are preferably removed in a step, after the removal of the off-flavor precursors, in order to minimize generation of additional off-flavor volatiles from the precursors. However, reversal of these steps can still yield juice with acceptable flavor.

Sulfur-containing volatiles are typically present in low amounts (less than 1 ppm) in the extracted juice, but give the juice undesirable aroma and flavor even at such low levels. Additional volatiles are formed from the precursors, especially upon exposure of the juice to air and/or heat. The present invention proccesses preferably reduce the sulfur-containing volatiles in the juice by at least about 80%, more preferably by at least about 90%, more preferably still by at least about 95%.

The use of activated charcoal, as described hereinabove, can be used to remove off-flavor volatiles, including sulfur-containing volatiles.

An evaporator or other concentrating equipment is used to remove certain volatiles from the juice or puree, and preferably to concentrate it. Standard evaporation under elevated temperatures and lower pressure can be used. Evaporation removes undesirable flavor notes and also some water. Evaporation should be carried out in a manner that artificial, cooked or manufactured flavors are minimized or totally eliminated. Therefore, low temperatures and/or times are preferred for such evaporation. The removed volatiles can be totally or partially recovered, concentrated and used for other food flavor applications, added back to the juice, or discarded.

A multi-stage, multi-effect vacuum evaporator such as the TASTE (thermally accelerated short time evaporator) can be used. The temperature profile is preferably controlled so that the maximum juice temperature is from about 40° C. to about 90° C. The evaporator can be operated using either forward flow or mixed flow.

In each case, forward or mixed flow, the steam and the vapor flow in the first effect (vessel with steam flow) and in subsequent effects is in the same pattern. The juice vapor starts at the highest pressure and ends at the stage with the lowest pressure. Any suitable vacuum system can be used to remove non-condensables, but typically this will be a multi-stage steam ejector system. The process is preferably operated at pressures of about 2 inches (50 mm) to about 4 inches (100 mm) of mercury absolute.

In a multiple effect evaporator, steam is used only on the first effect and each subsequent effect is heated by vapor evaporated in the preceding stage. This vapor is primarily water, but it also contains volatile materials originally in the juice. These volatiles can be recovered by removing part of the vapors from the heating side of the evaporation effect. This removal stream can be passed through a series of fractionators, condensers, and coolers to obtain a cold liquid essence rich in volatile fractions. This procedure is commonly practiced in the industry.

Newer types of evaporators such as the narrow bore ascending liquid column evaporator, Sigma Star (available from Schmidt GmbH., Bretten, Germany), are preferably applied. Also, a wiped film evaporator with the condenser built directly into the center of the wiped film evaporator, as in the short path evaporator manufactured by Leybold-Heraeus, Hanau, Germany for oil separation/distillation, is preferably applied.

For small scale batches, a rotary or centrifugal evaporator, such as a centritherm can be used.

The volatiles in the juice consist of "beany", green pepper, potato, caramel, mint and earthy notes. Most of these materials are removed in the volatile removal process. Preferably at least 50% of the volatiles are removed and most preferably about 90% of the volatiles are removed during the evaporation. The most preferred products have a methylene chloride extract of volatiles of from about 1 ppm to about 25 ppm. This is easily measured by gas chromatographic analysis. As measured by the method provided herein below, the methylene chloride extract of a fresh acidified Luo Han Guo juice from the green peel variety of *S. grosvenorii* has about 50 to 60 ppm volatiles. The methylene chloride extract of the processed juice has about 2 ppm volatiles.

The evaporator volatiles are generally not added back to the concentrated juice, because they have off-flavors. These volatiles can be fractionated to separate desirable flavors. If the water content of the evaporator volatiles is high, or if the evaporator volatiles are to be stored, then it is more economical to concentrate the evaporator volatiles, e.g., by conventional rectification processes.

The evaporated concentrate is cooled and can either be sent to a blend tank and mixed with other components of the product or further chilled to about −18° C. and stored in tanks and drums under an inert gas atmosphere such as nitrogen or carbon dioxide. These storage tanks should be shielded from light to prevent light-induced degradation of the concentrate.

The juice is preferably concentrated from a typical concentration of the puree of 9° to 24° Brix to about 15° to about 65° Brix. Preferably the juice puree or clear juice has a concentration of from at least 35° Brix and most preferably, from 40° Brix to 65° Brix. As used herein, "Brix" is essentially equal to % solids content.

Stabilization

Preferred processes of the present invention include a heating step in order to inactivate enzymes in the juice and/or pasteurize the juice. Inactivation of enzymes helps preserve flavor and stability of the juice. Pasteurization prevents microbial growth in the juice. Such heating process preferably holds the juice at a temperature of from about 90° C. to about 130° C. for from about 3 sec. to about 60 sec., more preferably from about 120° C. to about 125° C. for from about 3 sec. to about 5 sec., also preferably from about 90° C. to about 95° C. for from about 20 sec. to about 3 min.

The juice should be cooled to room temperature within about 30 minutes after heating. Preferably it is so cooled within 5 to 10 minutes.

Composition

The present invention includes sweet juice compositions made from Cucurbitaceae fruit according to any of the above processes.

Typically the sweet juice compositions of the present invention comprise, on a dry weight basis, from about 40% to about 60% sugars, such as glucose, fructose and sucrose; from 0% to about 25% protein (includes free amino acids and/or peptides); from 0% to about 4% fat; from about 1% to about 6% ash; from about 5% to about 20% organic acids, such as citric acid and malic acid; from 0% to about 2% vitamin C; and from 0% to about 10% other materials.

The present invention compositions preferably comprise, on a dry weight basis, less than about 100 ppm of the free amino acid methionine, more preferably less than about 70 ppm, most preferably less than about 50 ppm.

The present invention compositions comprise, on a dry weight basis, from about 0.1% to about 15% mogrosides, preferably greater than about 1% mogrosides, more preferably greater than about 4% mogrosides, most preferably still greater than about 7% mogrosides.

The compositions of the present invention can be analyzed for methylene chloride extractable volatiles and sulfur-containing volatiles according to Test Methods A and B hereinbelow. For such compositions before concentration (removal of water), of the sweet juice, the compositions preferably comprise less than about 30 ppm methylene chloride extractable volatiles; more preferably less than about 10 ppm, more preferably still less than about 6 ppm, most preferably less than about 3 ppm. For such compositions before concentration, the compositions preferably comprise less than about 0.5 (ratio to the standard) sulfur-containing volatiles, more preferably less than about 0.1, more preferably still less than about 0.05, most preferably less than about 0.02. For concentrated and dried compositions of the present invention, the preferred limits for methylene chloride extractable volatiles and sulfur-containing volatiles are determined by multiplying the above limits by the number of times the sweet juice is concentrated.

Sweet juice compositions of the present invention, especially when concentrated or dried, can be used to provide natural sweetness for many purposes. Examples of such uses to provide sweetness are in beverages, such as tea, coffee, fruit juice and fruit-flavored beverages; foods, such as jams and jellies, peanut butter, pies, puddings, cereals, candies, ice creams, yogurts, popcycles; health care products, such as dentifrices, mouthwashes, cough drops, cough syrups; chewing gum; and as a sugar substitute.

Blending

Sweet juice compositions of the present invention can be blended with other fresh sterilized or pasteurized juice to make lower calorie (lower sugar) beverage products. On a volume/volume basis, blends of from 10:1 to 1:100 are preferred.

The juice from the present invention processes is blended with other juices and flavors to make low calorie beverages. Such other juices include apple, cranberry, pear, peach, plum, apricot, nectarine, grape, cherry, currant, raspberry, gooseberry, blackberry, blueberry, strawberry, lemon, orange, grapefruit, potato, tomato, lettuce, celery, spinach, cabbage, watercress, dandelion, rhubarb, carrot, beet, cucumber, pineapple, custard-apple, pomegranate, guanabana, kiwi, mango, papaya, banana, watermelon, passion fruit and cantaloupe. Preferred other juices are apple, pear, lemon, grapefruit, cranberry, orange, strawberry, grape, kiwi, pineapple, passion fruit, mango, guava, cherry, rosehips, lychee, water chestnuts and cane sugars. Citrus juices are preferred for blending with the present invention juices because of their high acidity.

Citrus juice blends can also contain citrus pulp. From 0% to 19% (v/v) pulp is acceptable. Preferably, the amount of pulp will be 3% to 12% (volume/volume) and be 0.50 mm. to 5 mm. in size.

Flavors selected from natural flavors, botanical flavors and mixtures thereof can be added to the sweet juice of the present invention. The term "fruit flavors" refers to those flavors derived from the edible reproductive pan of a seed plant, especially one having a sweet pulp associated with the seed. Also included within the term "fruit flavor" are synthetically prepared flavors made to simulate fruit flavors derived from natural sources.

The term "botanical flavor" refers to flavors derived from pans of a plant other than the fruit: i.e. derived from bean, nuts, bark, roots and leaves. These include spice flavors. Also included within the term "botanical flavor" are synthetically prepared flavors made to simulate botanical flavors derived from natural sources. Examples of such flavors include cocoa, chocolate, vanilla, coffee, kola, tea, cinnamon, clove and the like. Botanical flavors can be derived from natural sources such as essential oils and extracts, or can be synthetically prepared.

The particular amount of the flavor component effective for imparting flavor characteristics to the beverages of the present invention ("flavor enhancing") can depend upon the flavor(s) selected, the flavor impression desired, and the form of the flavor component. The flavor component can comprise at least 0.001% by weight of the beverage composition, and preferably it is from about 0.01% to about 10%. When fresh juices are used as the flavor, the level of juice can be from about 0.05% to about 65%.

Test Method A

Measurement of Volatiles

1. Equipment and Procedure

The methylene chloride soluble components of the juice are analyzed using a Hewlett Packard 5880A gas chromatograph equipped with a split/splitless injector and a 30 m.×0.32 mm. I.D. fused silica capillary column. The column has a 1 m thick DB-5 stationary phase. The DB-5 phase is a mixture of 5% diphenyl, 94% dimethyl and 1% vinyl polysiloxanes (J&W Scientific, Folsom, Calif.).

The gas chromatograph oven is programmed to increase the temperature from 37° C. where it is held for 7 min. after injection, to 80° C. at a rate of 3° C./min.; the temperature then is raised to 90° C. at a rate of 1°/min. and then to 190° C. at a 30/min. rate. Finally the column is raised to 250° C. at 5°/min. The chart speed for the detector output is 0.5 cm/min. Eluting components are detected by a flame ionization detector. Sensory evaluations are performed simultaneously at a sniff port.

The samples are prepared as follows:

Twenty grams (20 g) of puree plus 5 ml water are spiked with 51.5 mg cyclohexyl cyclohexanone (the internal standard) and homogenized with 5 ml of methylene chloride for 30 seconds using a Tekmar Tissuemizer ® (setting on dial 6-7). The sample is then centrifuged at 15,000 rpm for 45 minutes at 0° C. A 2 μl aliquot is taken from the methylene chloride layer and injected directly into the gas chromatograph. It is expected that the extraction efficiency for this fruit is at least 75%.

Test Method B

Measurement of Sulfur-Containing Volatiles

Eight ml of methylene chloride are added to 10 grams of sample. Fifty ul of a 100 ppm solution of 2-isopropyl-4-methyl thiazole is added as an internal standard. The samples are then homogenized for 30 seconds and centrifuged at 1000 rpm for 30 minutes. Five ml of the methylene chloride extract are transferred to a volumetric vial and evaporated to a volume of 0.5 ml. One ul of this solution is injected into an HP 5880A capillary GC with a flame photometric sulfur detector. Results are determined as a detector response (peak area) ratio to the internal standard.

The following non-limiting examples illustrate processes of the subject invention.

EXAMPLE I

Luo Han Guo fruit from China is picked and washed in water containing 20 ppm chlorine. The fruit is peeled by hand and the outer crust is removed. The core or meat of the fruit is mashed by hand and then passed through a finisher containing a strainer with a mesh size of 0.02 in. (0.05 cm) to 0.025 in. (0.012 cm). Citric acid is added to the juice which emerges from the finisher to lower the pH to less than 4.0. This acidified juice is processed in a blender for 45 seconds to form a juice puree having a particle size of less than 850 microns. It is passed through a 20 mesh screen (0.51 mm) to remove small seed pieces.

The filtered juice puree is then evaporated using a standard laboratory rotary evaporator system. The bath temperature is 52° C. to 54° C. and the juice is evaporated at a 26 (650 mm) to 28 inch (700 mm of mercury) vacuum.

The volatiles are discarded along with the water. The concentrated juice is hot pack pasteurized at 85° C. to 95° C. with a hold time of 60 seconds, filled into glass jars and then cooled for 20 to 30 minutes in an ambient temperature water bath.

EXAMPLE II

A juice prepared according to Example I is dissolved in a beverage of which 35% of the solids are orange juice solids. It is prepared by mixing 6.22 grams of frozen concentrated orange juice, 91.28 grams of water and 2.5 grams of Luo Hah Guo juice. The resulting juice blend is pasteurized and hot packed as described in Example I. After seven days storage in sealed containers at ambient (20° C.) or refrigerator temperatures, the juices are microbially stable, i.e., they show no growth of E. coli, yeast, salmonella and Pseudomonas, in a standard microbial assay.

The intensity of the sweetness of juice from Example I blended with 35% juice shows that at a 2.5% level its intensity is similar to 35% juice to which 3% sugar has been added. In this sample, the juice from Example I is about 7 times sweeter than sugar, on a dry basis.

The following four non-limiting examples illustrate procedures which can be carried out to remove off-flavor materials and precursors from Luo Han Guo juice prepared in accordance with the present invention.

EXAMPLE III

Luo Hah Guo juice puree samples prepared in accordance with the Example I procedure are stored frozen to minimize oxidation reactions. Off-flavors and off-flavor precursors are further removed from the juice by the following three step procedure.

1. Removal of Puree Solids 500 g of freshly thawed Luo Han Guo puree is slurried with 2000 ml of distilled water and 50 g of Celite 545 diatomaceous earth (Fisher Sci. Co., No. C-212). The slurry is vacuum filtered on a 26 cm Buchner funnel through a single thickness of Pyrex fiberglass G/F filter "paper" (Whatman Co.). Optimum filtration is obtained using a water aspirator vacuum (about 15-20 mm Hg) to obtain 2270 g of a clear, pale yellow filtrate with 4.6 Brix and pH of 4.07. The unrinsed filter cake is discarded.

2. Removal of Sulfur-Containing Amino Acids and Soluble Protein Precursors

Commercially available ion exchange resin (Dow AG50W X8, 50-100 mesh) is washed repeatedly with 1N NaOH, water, 1N HCl, and more water to remove all signs of colored impurities and off-odors before use. The final water wash should be at neutral pH. An amount of clean resin is slurried in 0.1% citric acid solution to obtain 375 ml of wet, settled resin. The wet resin is suction-filtered to obtain a solution-free damp resin cake.

The damp resin is added rapidly to 2250 ml of filtrate from Step 1 during vigorous magnetic stirring in an open beaker. After stirring for 15 min. at room temperature, the slurry is rapidly filtered through a coarse glass flit Buchner funnel (10 cm×300 ml) using 15 mm Hg vacuum. It takes 1–2 min. filtration time to obtain 2250 g of pale yellow filtrate. The resin is not rinsed.

3. Removal of Already Formed Off-Flavors 2250 g of filtrate from Step 2 is stirred magnetically at room temperature in an open beaker. 22.5 g of Noritc SG activated charcoal (EM Science, No. CX0655-1) is gradually added during 5 min. The beaker is then covered with a layer of Saran Wrap and stirring is continued for 2 hours. The slurry is filtered through fiberglass G/F as described in Step 1 to obtain 2250 g of nearly colorless product having a Brix of 3.8 and a pH of 2.75. The filter cake is not rinsed. The final product is stored under a blanket of nitrogen at 34° F. in the dark or frozen until further use.

From the first filtrate in Step 1 to the final product in Step 3, about 86% of the amino-nitrogen (a measure of amino acid content) is removed and about 16% of the mogroside (naturally occurring sweet component in Luo Han Guo) is lost. The resulting juice is essentially free from odor and undesirable sulfurous, vegetable off-flavors. When pasteurized and stored at 32° C. for one week in the presence of air, no off-flavor is regenerated.

EXAMPLE IV

Additional frozen samples of Example I Luo Han Guo juice puree (50 liters) are freshly thawed and treated in the manner hereinafter described.

1. 50 liter of Luo Han Guo puree is diluted with an equal amount of distilled water in an agitated tank at room temperature. 18–19 Brix material is diluted to 10.5 Brix.
2. Diluted puree is centrifuged in a Westphalia OSC-4 separator operating at 7000–8000 g, to remove solid pulp material.
3. Gelatin solution (0.5%, 10 g solution/kg juice) and pectinase solution (1%, 12 ml solution/kg juice) are added to the centrifuged juice in a fining tank and agitated for 2 hours. Pectolytic treatment with enzymes boosts the efficiency of subsequent steps.
4. Bentonite 10% aqueous slurry (35 g/kg) and activated charcoal (1 g/kg) are added to adsorb proteins, amino acids, and low molecular weight odorizing components. The mixture is agitated for 30 min.
5. Gelatin solution (0.5%, 0.15 g/kg) and Kieselsol (silica, 1 ml/kg) are added for further off-flavor removal. The solution is agitated for 5 min. before clarification.
6. The solution is clarified again through the OSC-4 separator. The clarified product has a Brix measurement of 7.
7. The clarified juice is then ultra-filtered for additional removal of proteins, amino acids, and low molecular weight odorizing components. The final Brix measurement is 6.5

The resulting juice is a clear, pale yellow liquid with a significant decrease in off-flavor components.

EXAMPLE V

Luo Han Guo juice puree samples prepared in accordance with the Example I procedure are stored frozen to minimize oxidation reactions. Off-flavors and off-flavor precursors are further removed from the juice by the following procedures.

Pulp Removal

Water is added to 236 kg of puree at 18.5° Brix to dilute to 420 kg at 10.4° Brix. Diluted puree is centrifuged with a Westphalia OSC-35 separator operating at 650 kg/hr and 5–6 bar pressure. About 89 kg of puree pulp solids are removed during the centrifuging operation.

Pectin/Protein/Off-Flavor/Precursor Removal

Fining agents are added to the 33 1 kg of remaining juice. 1.7 kg of a 1% gelatin solution is added to the juice. This is followed by addition of 2.1 kg of a 2% pectinase solution. After 90 minutes, the juice is analyzed for pectin. When the juice tests negative for pectin, 12.9 kg of a 10% solution of sodium bentonite is added. After about 15 minutes, the juice is analyzed for protein. When the juice tests negative for protein, 0.3 kg of activated charcoal, 5.0 kg of a 1% gelatin solution, and 0.4 kg of a commercial silica solution are added.

Fining Agent Removal

The juice/fining agent mixture is centrifuged with a Westphalia OSC-35 separator operating at 700 kg/hr and 5–6 bar pressure. This results in 310 kg of juice at 8.7° Brix.

Enzyme Deactivation

A juice product is formulated as described in Example II using 1.6% of the purified Luo Han Guo juice. Enzymes are deactivated when the juice product is hot-packed by conventional methods at 95° C.

Through these processing steps, the Luo Han Guo juice maintains a high mogroside level while significantly reducing levels of off-flavors and off-flavor precursors.

EXAMPLE VI 1,000 kg of fresh Luo Han Guo fruit is washed in a disinfectant solution containing 10–20 ppm sodium hypochlorite. The fruit is then rinsed with pure water. The whole, clean fruit is partially chopped to break up the fruit without breaking seeds. The seeds, peel, pulp, and juice mixture is added to a centrifugal extractor to separate the majority of the juice from the seeds, peel, and pulp. Resulting juice is 400 kg at 11° Brix.

The seeds, peel, and pulp mixture is added to perforated baskets and extracted with 900 kg of 80° C. water for 30 minutes. The resulting extract is 4.7° Brix and is added to the juice. The combined juice/extract mixture is 7.5° Brix and 45°–50° C. Lemon juice concentrate at 50° Brix is added to adjust the Luo Han Guo pH to 3.8–4.2. 126 g of pectinase are added. After 90 minutes, the juice tests negative for pectin.

Fining agents are added to the juice including 400 g of activated charcoal, 6 kg of a 1% gelatin solution, and 440 g of a commercial silica solution. After 10 minutes, the juice temperature is raised to 70°–80° C. to coagulate additional proteins. After 15 minutes, the juice is filtered through a filter press using diatomaceous earth as a filter aid.

Filtered juice is pasteurized at 125° C. for 3–5 sec in a commercial pasteurization unit. Volatiles are removed and the juice is partially concentrated using a low temperature rotary evaporator operating at 50° C. and 4 in Hg abs. The juice is pasteurized again at 125° C. for 3–5 sec for microbial control. Resulting concentrated juice is 20° Brix. The juice is packed into plastic buckets and frozen for future use.

EXAMPLE VII

Sweet juice from Example III above is mixed with a suitable diluent (polydextrose or maltodextrin). The resulting solution is placed in flasks and cooled in an alcohol/dry ice mixture. The flasks are rotated so the solution freezes in a thin coating on the flask wall. The flasks are attached to a "Labconco Freeze Dryer 4.5" freeze dryer and evacuated by means of a vacuum pump. The flasks are continuously evacuated until the free water is sublimed off (15–36 hours). The vacuum is released, and the dry juice composition is removed.

Alternatively, dried sweet juice is prepared by adding 0.1N sodium hydroxide solution to the starting juice until the pH is increased to about 5.5, and then freeze drying by the same process.

EXAMPLE VIII 1717 g of the sweet juice from Example III is partially neutralized to pH 5.5 by addition of 85 ml of 1N sodium hydroxide plus 85.5 ml 0.1N sodium hydroxide. The resulting solution is 3.3 Brix. 136 g of maltodextrin is added to the liquid with stirring and the solution is warmed. The solution is spray dried using a Niro Spray Dryer with the following conditions.

| | |
|---|---|
| Total time | 72 minutes |
| Inlet temperature | 200° C. |
| Outlet temperature | 98–102° C. |
| Air pressure | 53–42 mm water |
| Pump setting | 13–18% of maximum |
| Nozzle pressure | 1.5–1.6 bars |

A spray dried sweet juice is obtained.

While particular embodiments of the subject invention have been described, it would be obvious to those skilled in the art that various changes and modifications to the compositions disclosed herein can be made without departing from the spirit and scope of the invention. It is intended to cover, in the appended claims, all such modifications that are within the scope of this invention.

What is claimed is:

1. A process for preparing sweet juice from fruit of the Cucurbitaceae family comprising:
    (a) separating peel and seeds from unprocessed juice of the fruit;
    (b) removing of pulp solids from the fruit juice, whereby the juice consists of less than 2% pulp solids;
    (c) acidifying the juice to a pH of less than 5.3;
    (d) removing off-flavor precursors, which comprise sulfur-containing amino acids, from the juice; and
    (e) removing a methylene chloride extractable volatiles fraction from the juice.

2. The process of claim 1 which comprises the removal of off-flavor precursors by treatment of the juice with additives selected from the group consisting of cation exchange resins, adsorbents, fining agents, and precipitating agents, and removal of resulting ion exchange resin adsorbent, fining agent, precipitate material from the juice.

3. The process of claim 2 wherein at least 50% of the methylene chloride extractable volatiles and at least 80% of sulfur-containing volatiles are removed from the unprocessed juice.

4. The process of claim 3 wherein the juice is treated with pectinase to remove substantially all the pectin in the juice.

5. The process of claim 3 in which the juice is acidified with an acid selected from the group consisting of citric acid, malic acid, lactic acid, tartaric acid, acetic acid, phosphoric acid, sulfuric acid, hydrochloric acid and mixtures thereof to a pH of from about 3.8 to 4.2.

6. The process of claim 5 wherein the juice is treated with pectinase to remove substantially all the pectin in the juice.

7. The process of claim 6 wherein the juice is from Luo Han Guo fruit.

8. The process of claim 7 wherein the additives comprise those selected from the group consisting of gelatin, activated charcoal, bentonite, silica, and diatomaceous earth.

9. The process of claim 8 wherein the additives comprise a combination of activated charcoal, gelatin, and bentonite.

10. The process of claim 8 wherein the juice has a reduced methionine content of at least about 80%, and the juice has a mogroside content which has been reduced by no more than about 20%.

11. The process of claim 10 wherein the sulfur-containing volatiles of the juice is reduced by at least about 90%.

12. The process of claim 11 wherein the juice is concentrated to from about 15° Brix to about 65° Brix, and the concentrated juice is heated sufficiently to deactivate enzymes and pasteurize the juice.

13. The process of claim 7 wherein the additives comprise a strong acid cation ion exchange resin.

14. The process of claim 13 wherein the juice has a free methionine content which has been reduced by at least 80%, and the juice has a mogroside content that is reduced by no more than about 20%.

15. The process of claim 14 wherein the juice has a sulfur-containing volatiles content which has been reduced by at least 90%.

16. A processed sweet juice made from fruit of the Cucurbitaceae family, made according to claim 1 wherein the processed juice comprises less than about 100 ppm (dry basis) methionine, and from about 0.1% to about 15% (dry basis) sweet terpene glycoside.

17. The sweet juice of claim 16 which is made from Luo Han Guo fruit.

18. The sweet juice of claim 17 wherein the pH of the juice is less than about 4.5, (unconcentrated basis), and wherein the juice comprises greater than about 0.17% (dry basis) sweet terpene glycoside.

19. The sweet juice of claim 18 which comprises less than about 10 ppm (unconcentrated basis) methylene chloride extractable volatiles, and less than about 0.1 (unconcentrated basis) sulfur-containing volatiles (ratio to standard).

20. The sweet juice of claim 19 the sweet terpene glycoside comprise those selected from the group consisting of mogroside IV, mogroside V, 11-oxo-mogroside V, and siamenoside I and mixtures thereof.

21. The sweet juice of claim 20 which is clear juice, comprises at least about 1% (dry basis) mogrosides, less than 6 ppm (dry basis) methylene chloride extractable volatiles, a pH of from about 3.8 to about 4.2 (unconcentrated basis), and less than 0.05 (unconcentrated basis) sulfur-containing volatiles (ratio to standard).

22. The sweet juice of claim 16, 19 or 21 which has a solids concentration of from about 15° Brix to about 65° Brix.

23. A dry sweet material which comprises a dried sweet juice of claim 16, 19 or 21.

* * * * *